Patented July 28, 1931

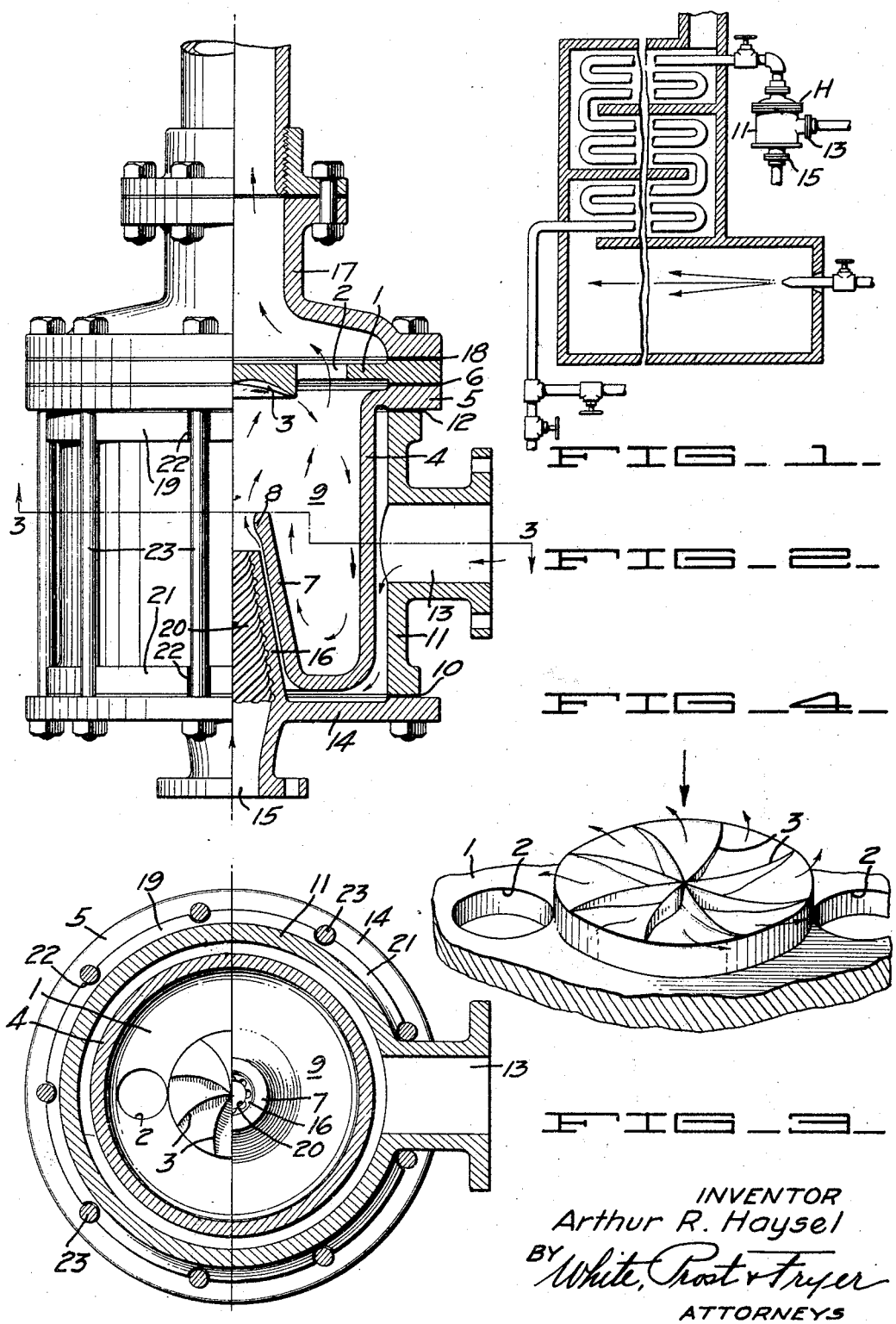

1,816,528

UNITED STATES PATENT OFFICE

ARTHUR R. HAYSEL, OF LOS ANGELES, CALIFORNIA, ASSIGNOR OF FORTY-NINE ONE-HUNDREDTHS TO CHARLES THOMPSON AND GEORGE K. THOMPSON, CO-PARTNERS IN TRADE, DOING BUSINESS UNDER THE FIRM NAME AND STYLE OF CHAS. & GEO. K. THOMPSON, OF LOS ANGELES, CALIFORNIA

MIXER HEAD

Application filed September 28, 1927. Serial No. 222,622.

Although my present invention is referred to as relating to means for and the method of treating oils, it may be stated at the outset that the means and methods herein described are capable of a great variety of uses. My invention may be regarded as relating somewhat broadly to means and methods for promoting interaction of fluids, although I herein describe the same with particular reference to the treatment of oils or oil mixtures.

It is an object of this invention to take advantage of various physical laws, including laws which govern turbulent flow and the relationship of velocity to pressure, in promoting interaction of fluids; and advantageous embodiments of my invention may comprise means and methods effective not only to produce fine initial subdivision and turbulent flow but to maintain such turbulent flow for a suitable interval of time.

It is an object of my invention to provide means and methods for expediting the attainment of equilibrium between interacting fluids, such as oils and steam (or water, or an acid, or an alkaline solution, or a gas, or hot or cold air) in which a fluid of a less density and greater fluidity may be used to produce some change in the purity or composition of a heavier fluid; and, for the purpose referred to, I may use means and methods wherein the lighter fluid, preferably projected at a high velocity through nozzles effecting an entrainment of one fluid in another, is fed at a pressure sufficiently high that the effects of friction may be added to the mixing effects of turbulent flow and the surface extending effects of fine subdivision, in expediting chemical or physical action between the fluids concerned.

One object of my invention is to provide a mixer head provided with a rifled nozzle or a plurality of telescoped nozzles, one of which is rifled and through which a light fluid is made to pass at a relatively high pressure and in which one fluid is made to entrain another fluid of higher density which passes through one of the other nozzles at a relatively low pressure and which then subjects these fluids so interengaged to a turbulent action.

The invention possesses other advantageous features, some of which with the foregoing will be set forth at length in the following description, where I shall outline in full one form of the mechanism and process of my invention. In the drawings I have shown one embodiment of my invention, but it is to be understood that the scope of my invention is to be limited only by my claims and the prior art.

Referring to the drawings:

Fig. 1 is a diagrammatic vertical section showing an advantageous use of my invention in connection with a pipe still.

Fig. 2 is an elevational view partly in section of my mixer head.

Fig. 3 is a cross-sectional view taken on the line 3—3 of Fig. 2 and looking in the direction as indicated by the arrows.

Fig. 4 is a perspective view of the baffle plate within the turbulence chamber of my mixer head.

My device comprises a circular baffle plate 1 provided with circularly disposed orifices 2. Centrally disposed on the under face of the baffle plate 1 are a plurality of fan shaped grooves or channels. It will be noted that these grooves possess a left hand twist. A cylindrical casing 4 provided with an outwardly extending flange 5 engages the member 1 through the medium of a suitable gasket 6. Integral with and extending upwardly from the lower end of the casing 4 is an outer nozzle 7. The inner end of this nozzle is provided with an inwardly extending bead 8. The baffle plate 1, casing 4 and nozzle 7 form a turbulence chamber 9. Concentrically disposed about the casing 4 and in spaced relation therewith is an outer cylindrical casing 11 provided with a flanged intake 13. This casing 11 engages the outwardly extending flange 5 of the casing 4 through a suitable gasket 12. The lower end of the casing 11 is closed by a head 14 and a gasket 10 and is provided with a flanged intake 15. Integral with the head 14 is an inwardly extending nozzle 16. This nozzle 16 is telescoped within and spaced from the nozzle 7 and has its inner surface rifled as at 20, the twist in the rifling being left handed to correspond to the twist in the channels 3. Engaging the upper outer periphery of the baffle plate 1 is a funnel shaped flanged outlet head 17. A suitable gasket 18 is interposed between the members 1 and 17. The casing 11 is provided with upper and lower flanges 19 and 21 which are notched as at 22. The members 17, 1, 4, 11 and 14 are detachably secured by means of bolts 23 which pass through suitable openings in the periphery of the members 17, 1, 4, and 14 and through the notches 22 in the flanges 19 and 21.

In Figure 1 my device has been indicated generally as H and shows one advantageous use to which it can be put.

The operation of my device is as follows: A light fluid is introduced into the inlet 15 at a relatively high pressure, say about 100 pounds. The rifling in the nozzle imparts a vortical motion to the fluid and gives its outer surface a corrugated form. It will be seen that the outer surface of the fluid, due to its vortical and helical path has an actual velocity far in excess of its vertical component along the axis of the mixer head, and in passing the bead 8 on the nozzle 7 creates an area of low pressure or a vacuum in the space between the two telescoped nozzles. A second fluid of greater density is introduced through the inlet 13 at a relatively low pressure, say 40 pounds. This heavier fluid due to the low pressure existing within the space between the nozzles 7 and 16 is forced through this space and is entrained in the vortically moving corrugated surface of the lighter fluid. The fluids so interengaged impinge upon the channeled surface of the baffle plate 1. During the interval of travel between the nozzles and the baffle plate 1, there has been relative motion between the two fluids, causing their inter-action and subdivision. On impinging against the baffle plate 1, due to the direction of twist of the grooved channels 3, the fluids are further subdivided and mixed, and are deflected with an increased vortical motion. On being deflected from the baffle plate 1, the interengaged fluids are subjected to a turbulent action in the turbulence chamber 9 and follow the path as indicated by the arrows in Fig. 2. It will be noted that the path of the fluids crosses itself before reaching the circularly disposed orifices 2. On passing through the orifices 2, the fluids are subjected to a still further subdivision so that by the time that the fluids have reached the outlet head 17, each fluid has been completely dispersed and intimately mixed with the other whereby the character of the mixture is substantially homogenous.

I claim:

1. A mixer head comprising a turbulence chamber; a plurality of spaced telescoped intake nozzles in communication with said chamber, one of which is rifled; an apertured channeled baffle plate in alinement with said nozzles; and a funnel shaped exit head.

2. A mixer head comprising means for imparting a vortical motion and a corrugated surface to a jet of fluid; a second means for causing a second fluid to be entrained in the corrugated surface of said jet, and further means for subjecting the fluids so entrained to a turbulent action.

3. A mixer head comprising a cylindrical casing; an axially disposed inlet opening; an axially disposed outlet opening; a rifled nozzle extending from said inlet opening; a second nozzle concentrically disposed about said first nozzle having communication with a second inlet opening; and an apertured grooved baffle plate in alinement with said nozzles.

4. A mixer head comprising a casing provided with two inlet openings and an outlet opening; means for imparting a vortical motion to an entering fluid and for causing a second fluid to be entrained by said first fluid; a channeled baffle plate for helically deflecting the fluids so interengaged; and means for effecting a turbulent action within the deflected fluid.

5. The process of intimately mixing two fluids consisting of imparting an advancing vortical motion of relatively high velocity to one of them; of corrugating its surface; of causing a second fluid to be entrained in the folds of said corrugations and in then subjecting these interengaged fluids to an extended turbulent action during which the path of the fluids crosses itself.

6. The process of intimately mixing two fluids consisting of imparting an advancing vortical motion of relatively high velocity to one of them; of giving a corrugated surface to this advancing fluid; of imparting a relatively low velocity to the other of said fluids; of causing this second fluid to be entrained in the folds of the corrugated surface of said first fluid; and in then subjecting these interengaged fluids to an extended turbulent action.

7. A mixer head comprising a rifled nozzle for imparting a vortical motion to a jet of fluid, a second nozzle for directing a second fluid into said jet and an inwardly extending bead on said second nozzle for creating an area of low pressure about said jet.

8. A mixer head comprising means for imparting a vortical motion to a jet of fluid, a nozzle for directing a second fluid into said jet, and an inwardly extending bead on said nozzle for creating an area of low pressure about said jet.

9. A mixer head comprising a chamber, a rifled nozzle in communication with said chamber; said nozzle being adapted to impart vortical motion to a jet of fluid, a second nozzle in communication with said chamber for directing a second fluid into said vortically moving jet, and a baffle plate in alignment with said nozzles for deflecting said fluids about said chamber with an increased vortical motion.

10. The process of intimately mixing two fluids consisting of imparting an advancing vortical motion of relatively high velocity to one of the fluids; of corrugating the surface of said fluid, of causing the other of the fluids to be entrained in the folds of said corrugations, of imparting an increased vortical motion to the entrained fluids and in then subjecting the entrained fluids to an extended turbulent action.

In testimony whereof, I have hereunto set my hand.

ARTHUR R. HAYSEL.